United States Patent
Guillois et al.

(10) Patent No.: US 8,783,010 B2
(45) Date of Patent: Jul. 22, 2014

(54) CASCADE TYPE THRUST REVERSER HAVING A PIVOTING DOOR

(71) Applicant: Aircelle, Gonfreville l'Orcher (FR)

(72) Inventors: Denis Guillois, Limours (FR); Laurent Albert Blin, Sainte Adresse (FR); Löic Chapelain, Thiais (FR)

(73) Assignee: Aircelle, Gonfreville l'Orcher (FR)

( * ) Notice: Subject to any disclaimer, the term of this patent is extended or adjusted under 35 U.S.C. 154(b) by 2 days.

(21) Appl. No.: 13/662,926

(22) Filed: Oct. 29, 2012

(65) Prior Publication Data

US 2013/0056554 A1 Mar. 7, 2013

Related U.S. Application Data

(63) Continuation of application No. PCT/FR2011/050597, filed on Mar. 22, 2011.

(30) Foreign Application Priority Data

Apr. 28, 2010 (FR) ..................................... 10 53244

(51) Int. Cl.
*F02K 1/60* (2006.01)
*F02K 1/62* (2006.01)
*F02K 1/70* (2006.01)

(52) U.S. Cl.
USPC .... 60/226.2; 60/232; 244/110 B; 239/265.19; 239/265.29

(58) Field of Classification Search
USPC ....... 239/265.19, 265.25, 265.29; 244/110 B; 60/230, 226.2, 232, 226.3
See application file for complete search history.

(56) References Cited

U.S. PATENT DOCUMENTS

| 3,279,182 | A | | 10/1966 | Helmintoller |
| 3,605,411 | A | | 9/1971 | Maison et al. |
| 5,875,995 | A | * | 3/1999 | Moe et al. ................. 244/110 B |
| 5,987,880 | A | | 11/1999 | Culbertson |
| 7,484,356 | B1 | * | 2/2009 | Lair .............................. 60/226.2 |
| 2002/0157377 | A1 | * | 10/2002 | Ahrendt .......................... 60/204 |
| 2010/0257841 | A1 | * | 10/2010 | Pero et al. .................... 60/226.2 |

FOREIGN PATENT DOCUMENTS

| EP | 0926333 | | 6/1999 |
| EP | 0926333 | A1 | 6/1999 |
| FR | 2914956 | | 10/2008 |
| FR | 2914956 | A1 | 10/2008 |
| FR | 2915526 | | 10/2008 |
| FR | 2915526 | A1 | 10/2008 |
| FR | 2916484 | | 11/2008 |
| FR | 2916484 | A1 | 11/2008 |
| FR | 2935354 | | 3/2010 |
| FR | 2935354 | A1 | 3/2010 |
| GB | 1181746 | | 2/1970 |
| GB | 1181746 | A | 2/1970 |

\* cited by examiner

*Primary Examiner* — Andrew Nguyen
(74) *Attorney, Agent, or Firm* — Brinks Gilson & Lione

(57) ABSTRACT

A thrust reverser with doors having at least one stationary structure is provided, on which at least one door is mounted pivoting between a closed position in which the door closes the reverser and makes up an outer cowling part, and an open position in which the door opens a passage in the stationary structure and can at least partially block a flow of air generated by a turbojet engine so as to reorient the door. The stationary structure includes at least two sets of cascade vanes that can be covered by the door when in the closed position.

7 Claims, 2 Drawing Sheets

CASCADE TYPE THRUST REVERSER HAVING A PIVOTING DOOR

CROSS-REFERENCE TO RELATED APPLICATIONS

This application is a continuation of International Application No. PCT/FR2011/050597 filed on Mar. 22, 2011, which claims the benefit of FR 10/53244, filed on Apr. 28, 2010. The disclosures of the above applications are incorporated herein by reference.

FIELD

The present disclosure relates to a thrust reverser with doors as well as a nacelle equipped with such a thrust reverser.

BACKGROUND

The statements in this section merely provide background information related to the present disclosure and may not constitute prior art.

During landing of an aircraft, the role of the thrust reverser is to improve the braking capacity of the airplane by reorienting at least part of the thrust generated by the turbojet engine forward. In that phase, the reverser obstructs the gas jet nozzle and orients the jet flow from the engine toward the front of the nacelle, thereby generating a counter-thrust that is added to the braking of the airplane's wheels.

The means used to perform this reorientation of the flow vary depending on the type of reverser. However, in all cases, the structure of a reverser includes moving cowls that can be moved between a deployed position in which they open a passage in the nacelle for the deflected flow on the one hand, and a retracted position in which they close that passage on the other hand. These moving cowls may also perform a deflection function or simply serve to activate other deflection means.

In cascade reversers, for example, the moving cowls slide along rails so that by pulling back during the opening phase, they expose the cascade vanes arranged in the thickness of the nacelle. A link rod system connects the moving cowl to blocking doors, which are deployed inside the discharge channel and block the outlet in direct flow. In reversers with doors, however, each moving cowl pivots so as to block the flow and deflect it, and is therefore active in that reorientation.

More specifically, a thrust reverser device with doors includes one or more doors pivotably mounted so as to be able, under the action of driving means, to tilt between a so-called closed inactive position during so-called direct jet operation of the turbojet engine, in which the doors are part of the downstream section, and a reversed position or open position in which they tilt such that a downstream portion of each door at least partially obstructs the duct of the nacelle and an upstream portion opens a passage in the downstream section to allow the flow of air to be channeled radially in relation to a longitudinal axis of the nacelle.

The pivot angle of the doors is adjusted so as to greatly reduce or even eliminate the thrust force generated by the flow escaping in direct jet, possibly until a counter-thrust is generated while generating a component of the flow deflected in the upstream direction of the nacelle.

For a general description of thrust reversers with doors, see documents FR 1 482 538, FR 2 030 034, or U.S. Pat. No. 3,605,411.

To be able to improve the reorientation of the flow of air in a direction tending as much as possible toward a longitudinal direction of the nacelle, the doors are also equipped with end inserts, also called deflectors, forming a return upstream of the door substantially perpendicular thereto. Thus, when the door is in the thrust reversal position, the insert is oriented in a substantially longitudinal direction of the nacelle and forces the flow of air in that direction.

This insert is mounted to be retractable into the thickness of the door so as to prevent the insert from penetrating the circulation tunnel of the flow of air and blocking the flow of air circulating in direct jet in the closed position.

Improvements in the effectiveness of thrust reversers are continuously sought so as to be able to simplify the operation thereof and consequently increase their reliability and performance and decrease their mass.

SUMMARY

The present disclosure aims to increase the quantity of air reversed for a same opening section of the nacelle, to the point of potentially making it possible to decrease or even eliminate inserts, for example.

To that end, the present disclosure relates to a thrust reverser with doors having at least one stationary structure, on which at least one door is mounted pivoting between a closed position in which it closes the reverser and makes up an outer cowling part, and an open position in which it opens a passage in the stationary structure and can at least partially block a flow of air generated by a turbojet engine so as to reorient it, characterized in that the stationary structure also bears at least one set of cascade vanes that can be covered by the door when in the closed position.

Thus, by attaching one or more sets of cascade vanes to the reverser system with doors, the reverser performance of the device is greatly improved.

The surface area of the door, and of the corresponding door well, can thus be reduced. The bulk and weight of the thrust reverser are thus greatly reduced.

Advantageously, the set of cascade vanes is arranged at one side of the door. In fact, this is a leak area at which the flow of air can escape laterally without being deflected by the door. Thus, the lateral cascade vanes make it possible to capture that non-deflected air and force its deflection, thereby greatly increasing the thrust reverser performance.

In one form, the thrust reverser includes two cascade vane assemblies, arranged laterally on either side of the door.

In an advantageously complementary manner, the door is equipped with at least one deflector insert at an upstream end thereof.

In another form, the deflector insert is arranged in a plane substantially perpendicular to the plane of the door.

In still another form, the deflector insert is mounted to be retractable in the closed position of the door so as not to penetrate a tunnel of the turbojet engine.

According to a first form of the present disclosure, the thrust reverser includes two reverser doors, arranged on either side of a longitudinal axis of the nacelle.

According to a another form, the thrust reverser only includes a single reverser door. In fact, increasing the reverser performance can make it possible to eliminate the doors for the same effectiveness.

Advantageously, the set of cascade vanes includes cascade blades with an adjustable orientation. This allows possible driving of the vectorization of the reversed flow of air by adapting the vane profiles.

The present disclosure also relates to a turbojet engine nacelle, characterized in that it is equipped with at least one thrust reverser system according to the teachings of the present disclosure.

DRAWINGS

The present disclosure will be better understood in light of the following detailed description in relation to the appended drawings, in which.

Figure 1:
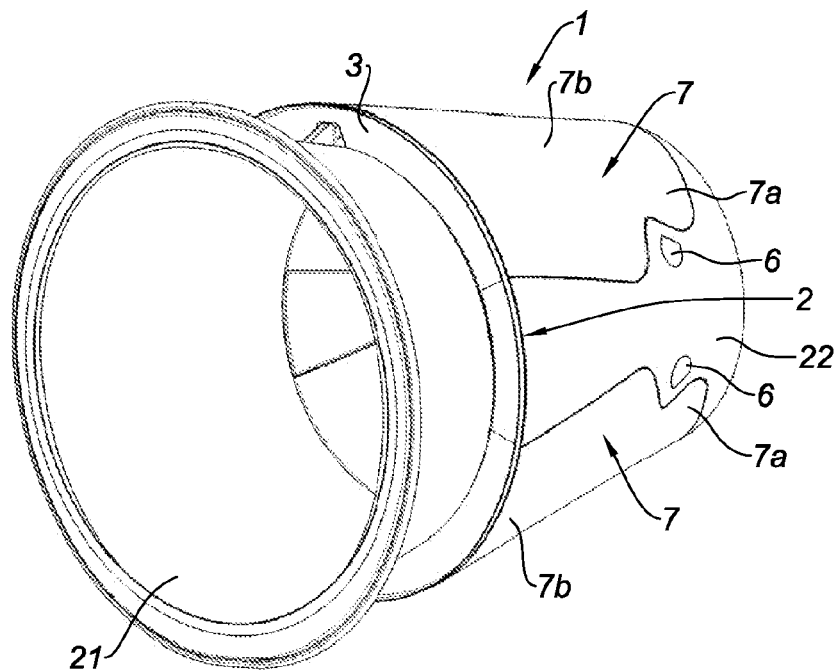
FIG. 1 is a diagrammatic illustration of a thrust reverser device with two doors according to the teachings of the present disclosure, the doors being in the closed position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
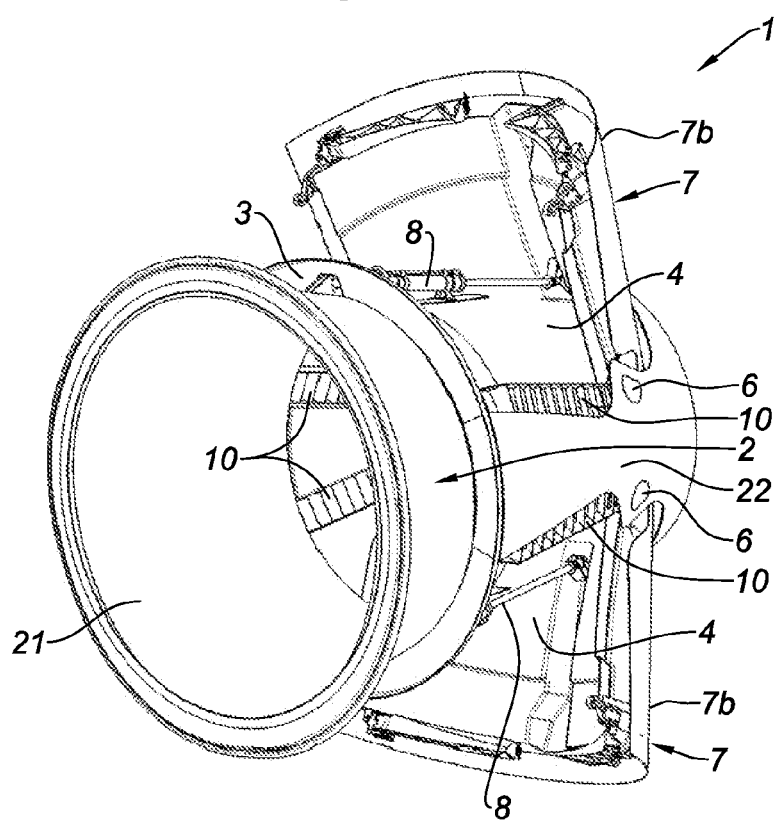
FIG. 2 is an illustration of the thrust reverser device of FIG. 1 with the doors open.

FIGS. 1 and 2 show a first exemplary form of a thrust reverser 1 with doors according to the teachings of the present disclosure.

A nacelle (not shown) according to the present disclosure constitutes a tubular housing for a turbojet engine for which it serves to channel the flow(s) of air it generates.

The nacelle is more particularly intended to be fastened on one side of the fuselage of the airplane using a pylon.

More specifically, the nacelle has a structure including a front section made up of an air intake, a middle section surrounding a fan of the turbojet engine, and a downstream section surrounding the turbojet engine and housing a thrust reverser system. This downstream section can be extended by a section forming a jet nozzle.

Only the downstream section will be described in detail hereafter and only said section is shown in FIGS. 1 to 4.

FIGS. 1 and 2 show a first form of a downstream section 1 housing a thrust reverser device according to the present disclosure.

In general, the downstream section 1 has a substantially tubular and tapered shape including a stationary structure 2 having an outer surface 21 and an inner surface 22 connected upstream by a peripheral front frame 3 and coming together downstream.

This stationary structure 2 has two lateral recesses on either side of a longitudinal axis of the downstream section 1 and each defining a side opening 4 on which hinge pins 6 are mounted supporting a door 7.

Each door 7 can tilt around an axis defined by the hinge pins 6 between a first closed position in which it closes the side opening 4 and ensures the aerodynamic continuity of the outer surface 22 and the inner surface 21 of the stationary structure 2, and an open position in which a downstream part 7a of the door 7 at least partially penetrates the inside of the downstream section, thus being suitable for blocking part of the flow of air in direct jet and orienting it through the opening 4 where an upstream part 7b of the door 7 completes its reorientation in a direction oriented toward the front of the nacelle.

The general structure of the doors 7 is not the subject-matter of the present disclosure, and reference will be made to the knowledge of the person skilled in the art in the concerned field.

Each door 7 is actuated using an actuator 8 of the hydraulic, pneumatic, or electric jack type, among others, having a first end fastened in the door 7 and a second end secured to the stationary part 2, and more specifically mounted on the front frame 3. Advantageously, the first end is fastened substantially at a middle longitudinal axis of the corresponding door 7.

The downstream section 1 is also equipped with means for locking the door 7 in the closed position and retractable deflector inserts 9 arranged at an upstream end of the door 7 in a plane substantially perpendicular to the general plane of the door 7.

According to the present disclosure, each opening 5 is also equipped with sets of lateral cascade vanes 10 extending along the opening 5 in a substantially longitudinal direction of the downstream section 1.

These cascade vanes 10 complete the reversal of the flow of air when the doors 7 of the thrust reverser are actuated.

Each set of cascade vanes 10 are made from cascade blades whereof the orientation and number are determined as a function of the desired reversal efficiency.

Figure 3:
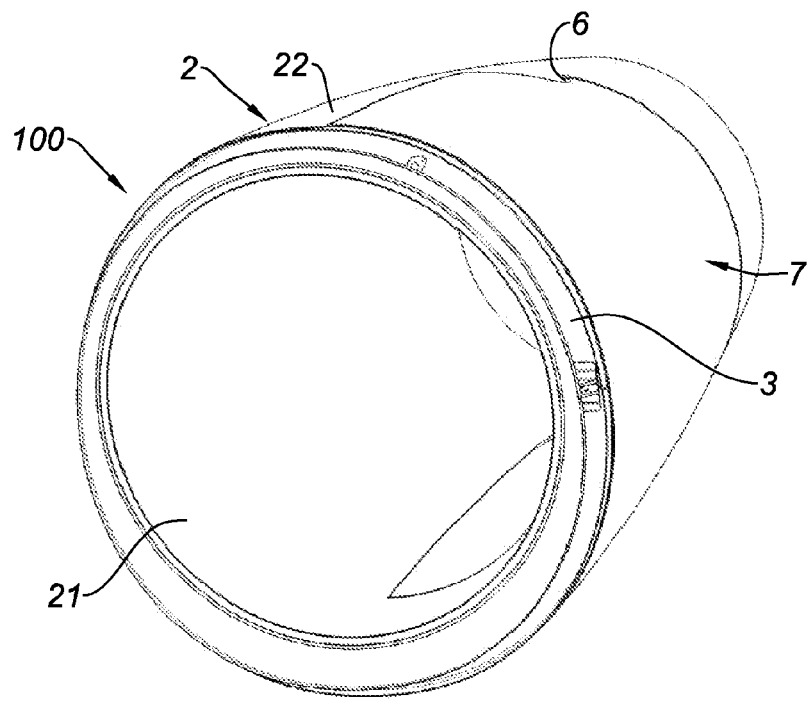
FIG. 3 is an illustration of a thrust reverser according to the teachings of the present disclosure with a single deflection door, the door being in the closed position.
Figure 4:
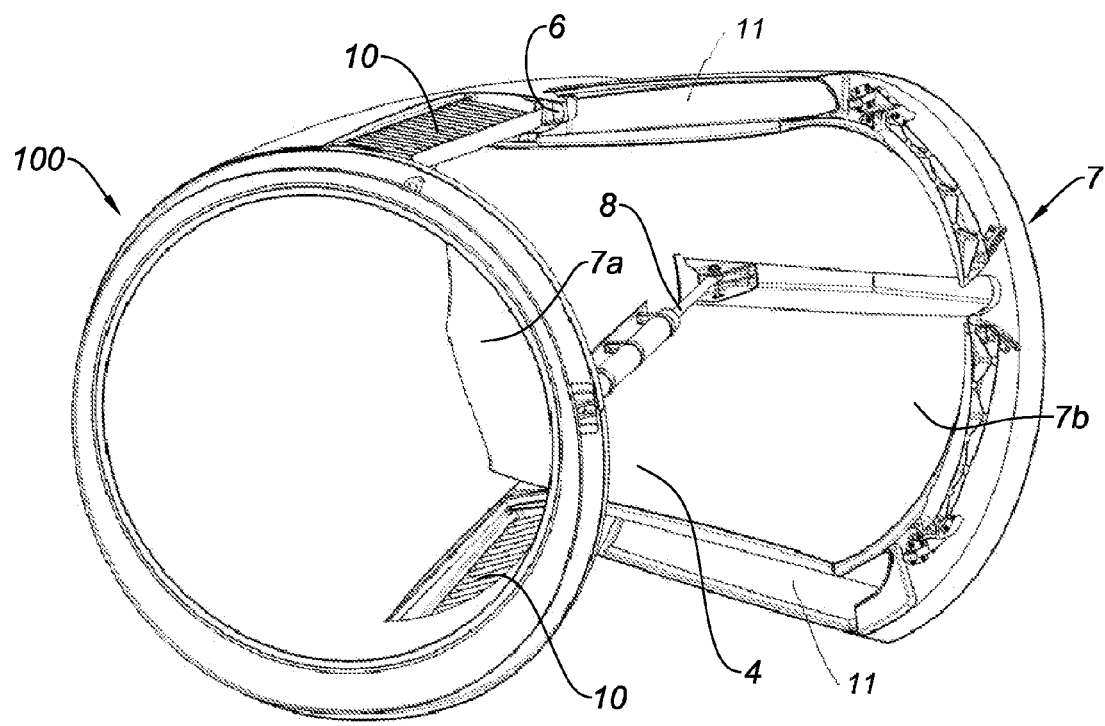
FIG. 4 is an illustration of the thrust reverser of FIG. 3 with the door in the open position.

FIGS. 3 and 4 show a second form of a downstream section 100 including a thrust reverser with doors according to the present disclosure only including a single door 7. FIG. 4 shows longitudinal slots 11 formed along opposed edges of the door 7, which cover the cascade vanes 10 in the closed position of the door 7.

The rest of the detailed description is identical to the first embodiment and the downstream section 1.

Although the invention has been described in relation to particular examples of embodiments, it is of course in no way limited thereto and encompasses all technical equivalents of the means described, as well as combinations thereof if they are within the scope of the invention.

What is claimed is:

1. A thrust reverser with doors having at least one stationary structure, on which at least one door is mounted pivoting between a closed position in which the at least one door closes the reverser and makes up an outer cowling part, and an open position in which the at least one door opens a side opening of the stationary structure and at least partially blocks a flow of air generated by a turbofan engine so as to reorient the air flow, wherein the stationary structure comprises at least two sets of cascade vanes being covered by longitudinal slots formed along opposed edges of the at least one door when in the closed position and being laterally arranged at each side of the door.

2. The thrust reverser according to claim 1, wherein the at least one door is equipped with at least one deflector insert at an upstream end thereof.

3. The thrust reverser according to claim 2, wherein the deflector insert is arranged in a plane substantially perpendicular to a plane of the at least one door.

4. The thrust reverser according to claim 2, wherein the deflector insert is mounted to be retractable in the closed position of the at least one door so as not to penetrate a tunnel of the turbofan engine.

5. The thrust reverser according to claim 1, wherein the thrust reverser further includes two reverser doors, arranged on either side of a longitudinal axis of a nacelle.

6. The thrust reverser according to claim 1, wherein the thrust reverser comprises a single reverser door.

7. A turbofan engine nacelle, wherein it is equipped with at least one thrust reverser system according to claim 1.

* * * * *